May 22, 1956  F. W. LEWIS ET AL  2,746,576
BRAKE BEAM CONNECTOR
Filed Dec. 11, 1950  2 Sheets-Sheet 1

INVENTORS
Frank W. Lewis
Irvin J. Spaeth
By Rodney Bedell
ATTY.

May 22, 1956  F. W. LEWIS ET AL  2,746,576
BRAKE BEAM CONNECTOR
Filed Dec. 11, 1950  2 Sheets-Sheet 2
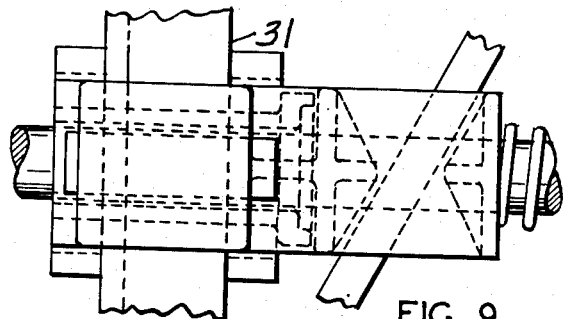
FIG. 9.
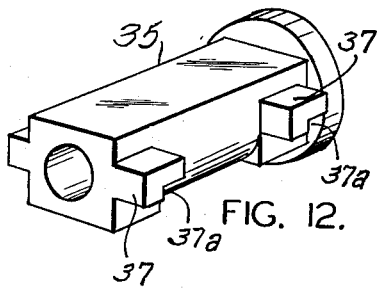
FIG. 12.
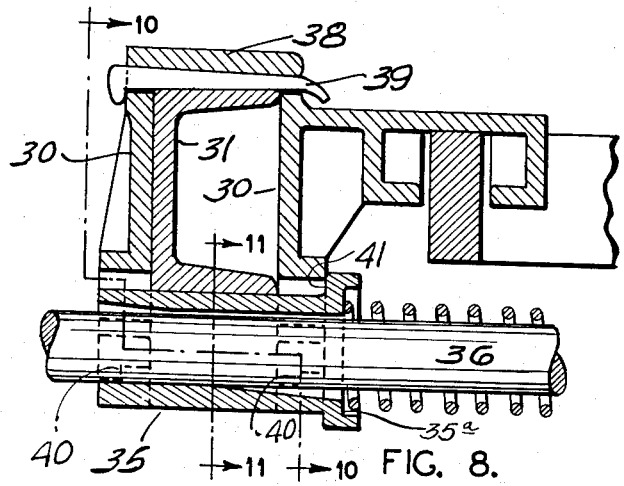
FIG. 8.
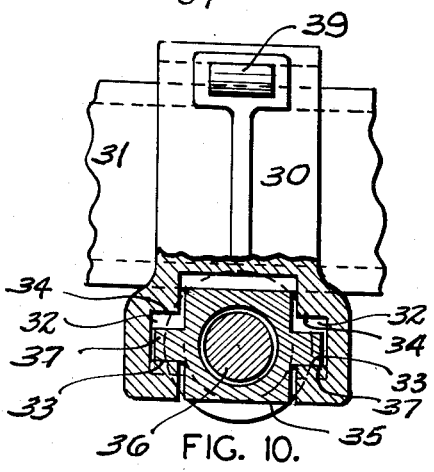
FIG. 10.
FIG. 11.
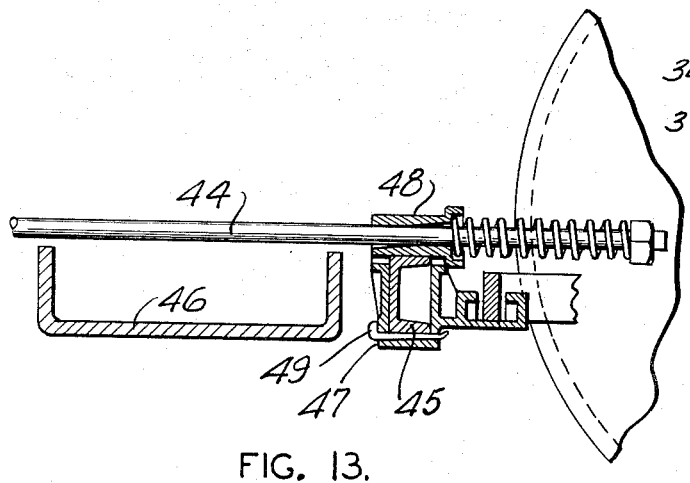
FIG. 13.
INVENTORS
Frank W. Lewis
Irvin J. Spaeth
BY Rodney Bedell
ATTY.

United States Patent Office 2,746,576
Patented May 22, 1956

2,746,576

BRAKE BEAM CONNECTOR

Frank W. Lewis and Irvin J. Spaeth, Chicago, Ill., assignors to Chicago Railway Equipment Company, Chicago, Ill., a corporation of Illinois Application December 11, 1950, Serial No. 200,166

11 Claims. (Cl. 188—210)

The invention relates to safety connectors for railway brake beams and more particularly to the assembly of a connection with a pair of beams at opposite sides of a truck bolster, spring plank, or other truck part, similar to the general arrangement disclosed in Hedgcock Patent No. 1,143,704 issued June 22, 1915.

The main object of the invention is to provide a safety connector for the purpose indicated without requiring bolts or like devices for attaching parts of the assembly to the beam, and without the necessity of the cooperation of spaced members of each beam or of the tying together of the spaced members of each beam by the support for the connector rod.

Other objects of the invention are to maintain a satisfactory assembly throughout the useful life of the structure and to avoid wear on the beam by the sliding of the connector rod over the beam.

In the accompanying drawings illustrating selected embodiments of the invention:

Figure 4:
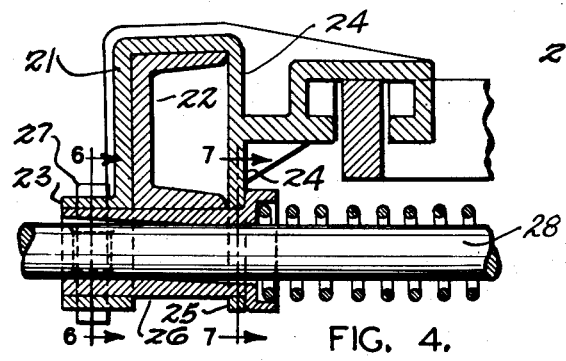
Figure 4 is a section corresponding generally to the right-hand portion of Figure 1 but illustrating another form of the invention and is taken on the line 4—4 of Figure 5.
Figures 6, 7:
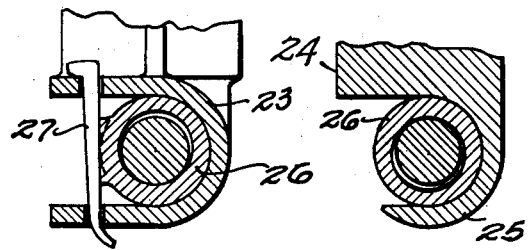
Figures 6 and 7 are detail vertical transverse sections taken on the corresponding section lines of Figure 4.

Figure 8 corresponds to Figure 4 but illustrates another form of the invention.

Figure 9 is a top view of the structure shown in Figure 8.

Figures 10 and 11 are detail vertical transverse sections taken on the section lines 10—10 and 11—11 of Figure 8.

Figure 12 is a perspective of the rod-receiving sleeve shown in Figures 8-11.

Figure 13 corresponds to Figure 8 but illustrates another form of the invention.

Figure 2:
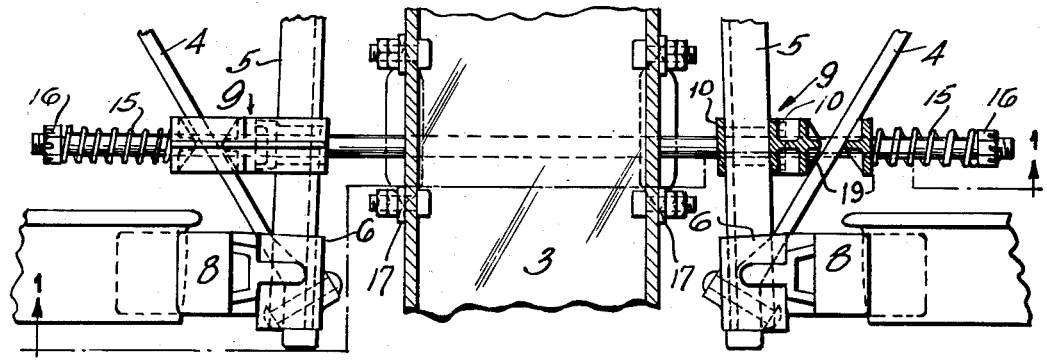
Figure 2 is, in part, a top view of the structure shown in Figure 1 and, in part, a horizontal section taken on the line 2—2 of Figure 1.
Figure 1:
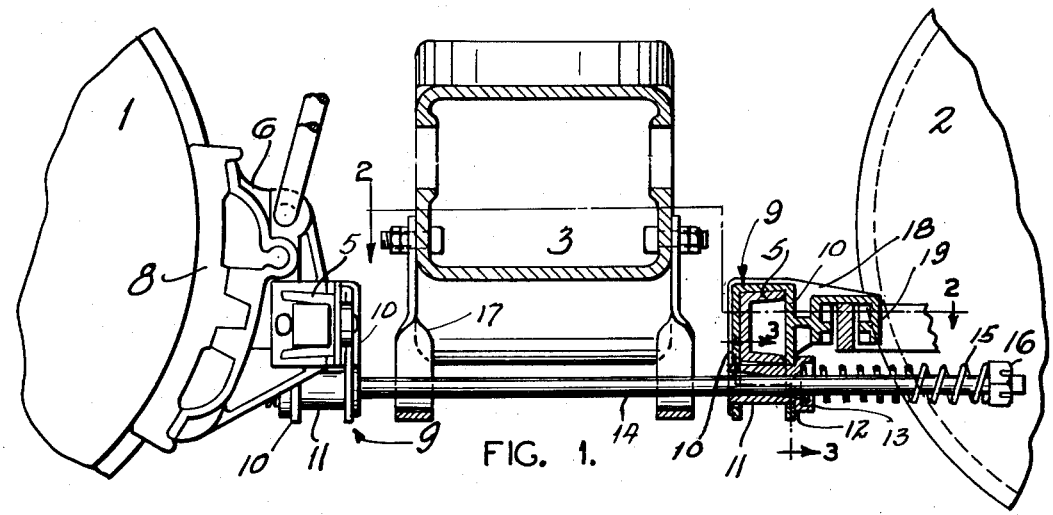
Figure 1 is, in part, a side elevation of a portion of a railway four-wheel truck and, in part, a longitudinal vertical section taken substantially on the line 1—1 of Figure 2.
Figure 5:
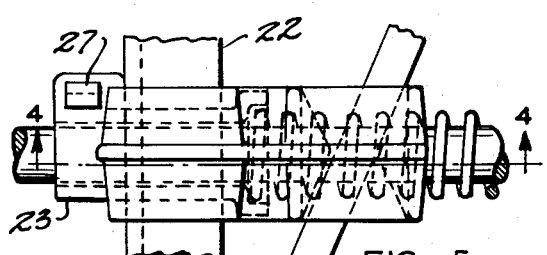
Figure 5 is a top view of the structure shown in Figure 4.
Figure 3:
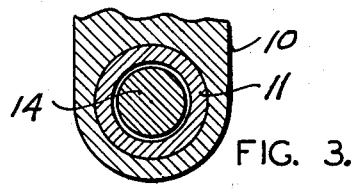
Figure 3 is a detail vertical transverse section taken on the line 3—3 of Figure 1 and drawn to an enlarged scale.

In the structure shown in Figures 1-3, the wheels 1 and 2 of a truck would mount the usual truck frame (not shown) which will mount springs (not shown) to support a bolster 3 extending transversely of the truck. A brake beam extends transversely of the truck at each side of the bolster and, as shown, is of the truss type, including a tension member 4, a compression member 5, and brake heads 6. The brake heads will mount shoes 8 which are applied to the wheels when the brakes are set and are moved away from the wheels when the brakes are released.

Depending from each beam is a bracket 9, preferably consisting of, or including, an inverted U-shaped structure straddling a beam main member, such as compression member 5, with the bracket legs 10 projecting downwardly beneath the beam and provided with aligned openings, the axis of which extends longitudinally of the truck. Preferably, sleeves 11 are disposed in the openings of legs 10 and each sleeve is shouldered at 12 to bear against one of the legs and is provided with a spring seat 13 facing in the direction opposite to the shoulder.

A connector rod 14 extends longitudinally of the truck beneath bolster 3 through sleeves 11 and bracket legs 10. Springs 15 are compressed between seats 13 and nuts 16 on the corresponding ends of the connector rod. Stirrups 17 are attached to bolster 3 and underlie rod 14, but the latter is carried normally by the brackets on the beams and slides back and forth in sleeves 11 as the brakes are applied by the usual levers (not shown) and as springs 15 move the beams from the wheels, when the brake levers are released, to prevent the shoes from dragging on the wheels.

When sleeves 11 are inserted in the brackets, and rod 14, springs 15 and nuts 16 are applied, the connector and the beams are assembled and the brackets cannot be removed from the beams, and this avoids the necessity of two-part brackets, with connecting bolts, as have been used in some previous devices for the same general purpose.

Preferably, but not necessarily, the bracket includes a lateral arm 18 with depending flanges 19 receiving between them the beam tension member 4. Flanges 19 are beveled at opposite sides, as best shown in the right-hand portion of Figure 2, to fit against the sides of tension member 4 and thus restrain the bracket from moving longitudinally of the beam, irrespective of the presence of connector rod 14. These beveled portions adapt the casting for use at either end of the beam and this eliminates the necessity of right and left castings. The bracket is stably mounted upon the beam because the opposing faces of its two depending legs are disposed to engage respectively the back of the channel compression member 5 and the edges of its flanges at points spaced vertically of the beam. The edges of the flanges of compression member 5 as well as the web of the compression member are contacted by the connector castings, gripping it closely so that the conector rod passing through the sleeve will hold the compression member vertical, thereby acting as a support and keeping the brake beam and brake heads from tilting from the position shown in Figure 1, as might occur with an unsupported brake beam.

In the structure shown in Figures 4-7, the general arrangement is substantially like that in Figures 1-3 but the bracket leg 21 alongside the back of the beam compression member 22 terminates near its lower end in a semi-circular flange 23, opening laterally, and the lower end of bracket leg 24 terminates in a lateral opening hook 25.

With this arrangement, sleeve 26 may be applied and removed from the bracket by movement transversely of its axis through the open sides of flange 23 and hook 25. Normally sleeve 26 is retained in position by a wdege key 27 inserted through aligned openings in the upper and lower portions of flange 23 or by other fastening device.

This arrangement will avoid the necessity of removing one of the nuts (as shown at 16 in Figures 1 and 2) on the end of the connector rod 28 as would be required to assemble and disassemble the structures shown in Figures 1-3.

Figures 8-12 illustrate another form of the invention in which each depending bracket leg 30 is bifurcated (Figure 10) and each side of the bifurcation has a groove 32 extending transversely of the beam and forming an upwardly facing surface 33, a downwardly facing surface 34, and a vertical shoulder 40, facing towards the left (Figure 8). The sleeve 35, receiving the connector rod 36, has substantially vertical outer sides, each provided with L-shaped wings 37 normally resting on surface 33 and having shoulders 37a disposed to oppose shoulders 40. Grooves 32 are deep enough to accommodate movement of the deepest portions of wings 37 therethrough.

The upper portion 38 of the bracket is apertured transversely of the beam to receive a wedge 39 which bears upon the top of beam compression member 31 and when driven home, as shown in Figure 8, lifts the bracket and sleeve 35 to force the top of the latter against beam member 31, as shown in Figures 8 and 10, thus locking the sleeve to the beam since the sleeve cannot move axially because elements 37a oppose shoulders 40 in one direction and the spring seat 35a forms a shoulder 41 opposing the bracket in the opposite direction.

Figure 13 shows an arrangement in which connector rod 44 and beams 45 are associated with a spring plank 46, the rod extending over the spring plank as in the above-mentioned Hedgcock patent. The bracket 47 and sleeve 48 and wedge 49 are substantially the same as the corresponding parts shown in Figures 8–12, but their relative position is inverted. In event of the failure of a brake hanger, the beam will be supported by engagement of the connector rod with the flanges of the spring plank. The brackets, sleeves, and connector rods shown in Figures 1–7 may be similarly assembled in inverted position.

The details of the structure may be varied substantially otherwise than as shown and the exclusive use of those modifications coming within the scope of the claims is contemplated.

What is claimed is:

1. In combination with a brake beam main member, an inverted U-shaped bracket straddling the member and projecting below it, a sleeve extending through both legs of said bracket beneath said member, key means securing the sleeve to the bracket, a safety connector extending through said sleeve, and a spring compressed between the end of said rod and said sleeve.

2. Structure for mounting a connector rod on a brake beam member comprising a U-shaped bracket with its legs spaced apart to receive the beam member between them, each of said legs being grooved transversely of the bracket to form an upwardly facing ledge, and a sleeve hollowed to receive a connector bar and provided with lateral wings slidable in said grooves.

3. Structure as described in claim 2 in which the sleeve is positioned to engage a portion of the beam member facing vertically in one direction, and a part of the bracket spaced from the sleeve is provided with a transversely extending passage, there being a wedge element slidable in said passage and disposed to engage a portion of the beam member facing vertically in the opposite direction.

4. Structure for mounting a connector rod on a brake beam member comprising a U-shaped bracket with vertical legs spaced apart to receive the beam member between them, the inner sides of said legs being grooved transversely of the bracket to form oposing recesses with upwardly facing ledges, each ledge being provided with a shoulder facing horizontally, and a sleeve hollowed to receive a connector bar and including lateral wings slidable in said recesses and resting on said ledges, said sleeve having an enlarged end seated against one of said legs and forming a spring seat facing outwardly of the sleeve, elements on said wings facing towards said seat and opposing said shoulders, said recesses being of sufficient width to permit relative vertical movement of the sleeve and bracket to disalign said shoulders and wings.

5. Structure for mounting a connector rod on a brake beam member comprising a U-shaped bracket with vertical legs spaced apart to receive the beam member between them, the inner sides of said legs being grooved transversely of the bracket to form opposing recesses with upwardly facing ledges, and a sleeve hollowed to receive a connector bar and provided with lateral wings slidable in said recesses, there being elements on said wings and the sides of said recesses normally facing each other longitudinally of the recesses, said recesses being of sufficient width to permit relative vertical movement of the sleeve and bracket to disalign said elements, and means for holding the structure to a brake beam with the sleeve immovable vertically in the bracket.

6. Structure for mounting a connector rod on a brake beam member comprising a U-shaped bracket with vertical legs spaced apart to receive a beam member between them, the outer end portions of said legs having aligned apertures, said legs having opposing recesses, with horizontal ledges, there being a transverse passage through the bracket remote from said aligned openings, a detachable sleeve with laterally projecting wings, each normally slidably engaging one of said ledges, each recess being wider than said wings, there being opposing elements on said wings and the sides of said recesses limiting the horizontal movement of the sleeve through the legs when the wings are seated against said ledges, and a wedge element slidable in said passage with a side spaced from and facing towards said sleeve.

7. In combination with a railway truss type brake beam including main members spaced apart transversely of their length, a one piece rigid bracket comprising a body, extending between and having horizontal portions engaging parts of said members facing vertically in the same general direction, a pair of elements, extending from said body and straddling one of said members and projecting from said body vertically beyond the member, and another pair of elements extending from said body portion and straddling the other member, a safety connector for the beam and an adjacent beam, comprising a sleeve extending through the projecting portions of said first-mentioned pair of elements adjacent to the corresponding main member of the beam and seated in a direction facing transversely of the beam against one of the first-mentioned pair of elements, a rod received in said sleeve and projecting in opposite directions therefrom, and a spring coiled about said rod and compressed between an end of the rod and an opposing end of said sleeve.

8. In combination with a railway truss type brake beam having a tension member and a compression member, a rigid bracket overlying and carried on both of said members and including an integral leg projecting downwardly between said members below the level of the beam, a horizontally disposed separable sleeve extending through said leg and underlying a portion of the beam, means detachably securing said sleeve to the leg, and a safety connector comprising a rod extending through said sleeve and spaced thereby from said beam members.

9. Structure as described in claim 8 in which the sleeve has a shoulder, facing in one direction and seated against the bracket leg, and has a spring seat facing in the opposite direction, there being a spring compressed between said spring seat and the end of the rod.

10. Structure for mounting a brake beam connector rod on a brake beam main longitudinal member, comprising a U-shaped bracket with its legs spaced apart to receive the beam member between them and having terminals with aligned apertures, a sleeve seated in said apertures and adapted to surround and support the connector rod, said apertures opening laterally to accommodate insertion of the sleeve transversely of its length into the apertures, and detachable means on at least one of said legs blocking the lateral opening to retain the sleeve in the apertures.

11. Structure for mounting a connector rod on a brake beam member comprising an inverted U-shaped bracket with upright legs spaced apart to receive the beam member between them, said legs terminating in laterally opening hook-like projections for receiving a connector rod transversely of its length, there being detachable means on said projections for preventing the movement of the rod from the projections.

References Cited in the file of this patent
UNITED STATES PATENTS

| | | |
|---|---|---|
| 1,534,192 | Tryon | Apr. 21, 1925 |
| 1,591,504 | Bettendorf | July 6, 1926 |
| 2,105,995 | Busse | Jan. 18, 1938 |
| 2,142,417 | Sale | Jan. 3, 1939 |
| 2,184,690 | Varga | Dec. 26, 1939 |
| 2,252,221 | Van Cleave et al. | Aug. 12, 1941 |
| 2,459,323 | Kass | Jan. 18, 1949 |
| 2,490,204 | Busch | Dec. 6, 1949 |
| 2,505,974 | Kass | May 2, 1950 |